United States Patent
Chen

(10) Patent No.: US 7,447,935 B2
(45) Date of Patent: Nov. 4, 2008

(54) COMPUTER DATA STORAGE UNIT REINSTALLATION DATA PROTECTION METHOD AND SYSTEM

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 537 days.

(21) Appl. No.: 11/189,841

(22) Filed: Jul. 27, 2005

(65) Prior Publication Data

US 2007/0028137 A1    Feb. 1, 2007

(51) Int. Cl.
*G06F 11/00* (2006.01)
(52) U.S. Cl. .............................. 714/5; 714/7
(58) Field of Classification Search ...................... 714/5
See application file for complete search history.

(56) References Cited

U.S. PATENT DOCUMENTS

| | | | | |
|---|---|---|---|---|
| 6,308,288 | B1 * | 10/2001 | Chang et al. | 714/38 |
| 7,043,664 | B1 * | 5/2006 | Chiloyan | 714/5 |
| 2004/0078720 | A1 * | 4/2004 | Ito et al. | 714/45 |
| 2005/0198631 | A1 * | 9/2005 | Bisher et al. | 717/178 |
| 2006/0224824 | A1 * | 10/2006 | Chen | 711/113 |
| 2007/0169109 | A1 * | 7/2007 | Neswal | 717/174 |
| 2007/0245344 | A1 * | 10/2007 | Kumagai et al. | 717/174 |

OTHER PUBLICATIONS

Vandersluis Chris, "Security and access key for data integrity" Oct. 24, 1996, Computing Canada, p. 25.*
Jose A. Berkley, "Data Access for the masses through OLE DB" 1996, vol. 25, issue 2, pp. 161-172.*

* cited by examiner

*Primary Examiner*—Scott T. Baderman
*Assistant Examiner*—Kamini Patel
(74) *Attorney, Agent, or Firm*—Muncy, Geissler, Olds & Lowe, PLLC

(57) ABSTRACT

A computer data storage unit reinstallation data protection method and system is proposed, which is designed for use with a computer platform for providing a reinstallation data protection function to a data storage unit that is to be installed onto the computer platform, which is characterized by the categorization of the utilization status of the data storage unit into 3 internal status attributes, including "unused status", "unrecognizable status", and "recognizable status" for internal use by the computer platform with the user interface still including only 2 external status attributes, i.e., usable status and has-been-used status. This feature can help prevent the data storage unit which contains data that are still wanted from being mistakenly regarded by the user as a brand new one and thus formatted by the user during installation that would cause all the data in the data storage unit to be lost.

7 Claims, 3 Drawing Sheets

COMPUTER DATA STORAGE UNIT REINSTALLATION DATA PROTECTION METHOD AND SYSTEM

BACKGROUND OF THE INVENTION

1. Field of the Invention

This invention relates to computer technology, and more particularly, to a computer data storage unit reinstallation data protection method and system which is designed for use with a computer platform, such as a network server, that is to be connected to a data storage unit, such as a RAID (Redundant Array of Independent Disks) unit, whose stored old data are intended to be used by the computer platform, for the purpose of preventing the RAID unit from being inadvertently formatted by the user during the reinstallation that would otherwise cause all the old data on the reinstalled RAID unit to be entirely lost.

2. Description of Related Art

RAID (Redundant Array of Independent Disks) is a multi-disk storage unit that contains two or more hard disks for providing a very large data storage capacity, and which is commonly connected in a network system to one or more servers for these servers to store the large amount of data that flow through the network system.

In actual applications, it is a common practice to install one RAID unit on a certain server and afterwards remove the RAID unit from that server and installed on another server for migrating data to another server. After that, the same RAID unit may be removed from the other server and reinstalled back to the original server. In this case, the original server will detect this condition and display a message to the user indicative of the has-been-used status of the reinstalled RAID unit, telling the user that the reinstalled RAID unit contains data that were previously used on this server. If the user still wants to use the old data on the reinstalled RAID unit the user needs to choose a non-formatting installation procedure for the reinstallation of the RAID unit. If the user inadvertently choose a formatting installation procedure, the old data on the RAID unit will be entirely lost.

If the user doesn't want to keep the old data on the reinstalled RAID unit and instead wants to reformat the RAID unit, then the user needs to manually choose an option in the user interface to change the utilization status of the RAID unit from "has-been-used status" into "usable status ", whereby the RAID unit is set to be reformattable. This precaution step can help prevent the reinstalled RAID unit which still contains usable data from being mistakenly regarded by the user as a brand new RAID unit and thus formatted by the user during the reinstallation procedure that would cause all the old data in the reinstalled RAID unit to be lost.

One drawback to the above-mentioned method, however, is that if a user (i.e., system management personnel) remove a RAID unit from a server and mistakenly install that RAID unit on another server of a not-fully-compatible model, then the other server might be unable to read the "has-been-used status" attribute data from that RAID unit, such that it will wrongly display a "usable status" message to the user. In this case, it would be highly likely that the user would mistakenly choose a formatting installation procedure that causes all the old data on the RAID unit to be entirely lost.

SUMMARY OF THE INVENTION

It is therefore the main objective of this invention to provide a computer data storage unit reinstallation data protection method and system which can help prevent a RAID unit that is removed from a server and mistakenly reinstalled on another server of a not-fully-compatible model from being inadvertently formatted by the user during the installation process that causes all the old data on the RAID unit to be entirely lost.

The computer data storage unit reinstallation data protection method and system according to the invention is designed for use with a computer platform, such as a network server, that is to be connected to a data storage unit, such as a RAID (Redundant Array of Independent Disks) unit, whose stored old data are intended to be used by the computer platform, for the purpose of preventing the RAID unit from being inadvertently formatted by the user during the reinstallation that would otherwise cause all the old data on the reinstalled RAID unit to be entirely lost.

The computer data storage unit reinstallation data protection method according to the invention comprises: (1) generating a utilization status inspection enable message in response to a data storage unit connecting event that is initiated when the data storage unit is being connected to the computer platform; (2) responding to the utilization status inspection enable message by inspecting the utilization status of the data storage unit and registering the inspected utilization status as an internal status attribute in such a manner that if the data storage unit is a new and unused one, the internal status attribute is registered as unused status, if the data storage unit contains data but hasn't previously been installed on the computer platform, the internal status attribute is registered as unrecognizable status, and if the data storage unit contains data and was previously installed on the computer platform, the internal status attribute is registered as recognizable status; (3) performing an external status attribute setting procedure to set an external status attribute for the data storage unit, in such a manner that if the inspected result is unused status, the external status attribute is set to usable status; if the inspected result is unrecognizable status, the external status attribute is also set to usable status; and if the inspected result is recognizable status, the external status attribute is set to has-been-used status; (4) responding to the external status attribute of the data storage unit by displaying a corresponding message in a user interface, in such a manner that in the case that the external status attribute is usable status, the user interface displays a message indicative of the usable status of the data storage unit; and whereas in the case of the external status attribute is has-been-used status, the user interface provides a user-selectable external status changing function for changing the external status of the data storage unit from has-been-used status to usable status; and (5)—performing an installation procedure for installing the data storage unit onto the computer platform, in such a manner that in the case that the external status attribute of the data storage unit is has-been-used status, either a formatting installation procedure or a non-formatting installation procedure is allowed depending on user-selection; and whereas in the case that the external status attribute is usable status and user-selected option is a formatting installation procedure, inspecting whether the internal status attribute of the data storage unit is unrecognizable status; and if YES, displaying an asking message for user confirmation.

In terms of concrete architecture, the computer data storage unit reinstallation data protection system according to the invention comprises: (a) a connection detecting module, which is capable of generating a utilization status inspection enable message in response to a data storage unit connecting event that is initiated when the data storage unit is being connected to the computer platform; (b) a utilization status inspecting module, which is capable of responding to the utilization status inspection enable message from the connection detecting module by inspecting the utilization status of the data storage unit and registering the inspected utilization status as an internal status attribute in such a manner that if the data storage unit is a new and unused one, the internal status attribute is registered as unused status, if the data storage unit contains data but hasn't previously been installed on the computer platform, the internal status attribute is registered as unrecognizable status, and if the data storage unit contains data and was previously installed on the computer platform, the internal status attribute is registered as recognizable status; (c) an external status attribute setting module, which is capable of responding to the inspected result by the utilization status inspecting module to perform an external status attribute setting procedure to set an external status attribute for the data storage unit, in such a manner that if the inspected result by the utilization status inspecting module is unused status, the external status attribute is set to usable status; if the inspected result is unrecognizable status, the external status attribute is also set to usable status; and if the inspected result is recognizable status, the external status attribute is set to has-been-used status; (d) a user interface displaying module, which is capable of displaying a user interface on the computer platform, and which is capable of responding to the particular external status attribute set by the external status attribute setting module by displaying a corresponding message in the user interface, in such a manner that in the case that the external status attribute is usable status, the user interface displays a message indicative of the usable status of the data storage unit; and whereas in the case of the external status attribute is has-been-used status, the user interface provides a user-selectable external status changing function for changing the external status of the data storage unit from has-been-used status to usable status; and (e) an installation module, which is capable of performing an installation procedure for installing the data storage unit onto the computer platform, in such a manner that in the case that the external status attribute of the data storage unit is has-been-used status, the installation module is allowed to perform either a formatting installation procedure or a non-formatting installation procedure depending on user-selection; and whereas in the case that the external status attribute is usable status and user-selected option is a formatting installation procedure, the installation module first inspects whether the internal status attribute of the data storage unit is unrecognizable status; and if YES, the installation module displays an asking message for user confirmation.

The computer data storage unit reinstallation data protection method and system according to the invention is characterized by the categorization of the utilization status of a RAID unit into 3 internal status attributes, including "unused status", "unrecognizable status", and "recognizable status" for internal use by the computer platform, but with the user interface still including only 2 external status attributes, i.e., usable status and has-been-used status, such that in the case that the external status attribute of the RAID unit is usable status and the user chooses to perform a formatting installation procedure, the internal status attribute of the RAID unit is first check to see if it is unrecognizable status; and if YES, an asking message is displayed for user confirmation. This feature can help prevent the RAID unit which contains data that are still wanted from being mistakenly regarded by the user as a brand new RAID unit and thus formatted by the user during installation that would cause all the old data in the RAID unit to be lost.

BRIEF DESCRIPTION OF DRAWINGS

The invention can be mole fully understood by reading the following detailed description of the preferred embodiments, with reference made to the accompanying drawings, wherein.

DETAILED DESCRIPTION OF PREFERRED EMBODIMENTS

The computer data storage unit reinstallation data protection method and system according to the invention is disclosed in full details by way of preferred embodiments in the following with reference to the accompanying drawings.

Figure 1:
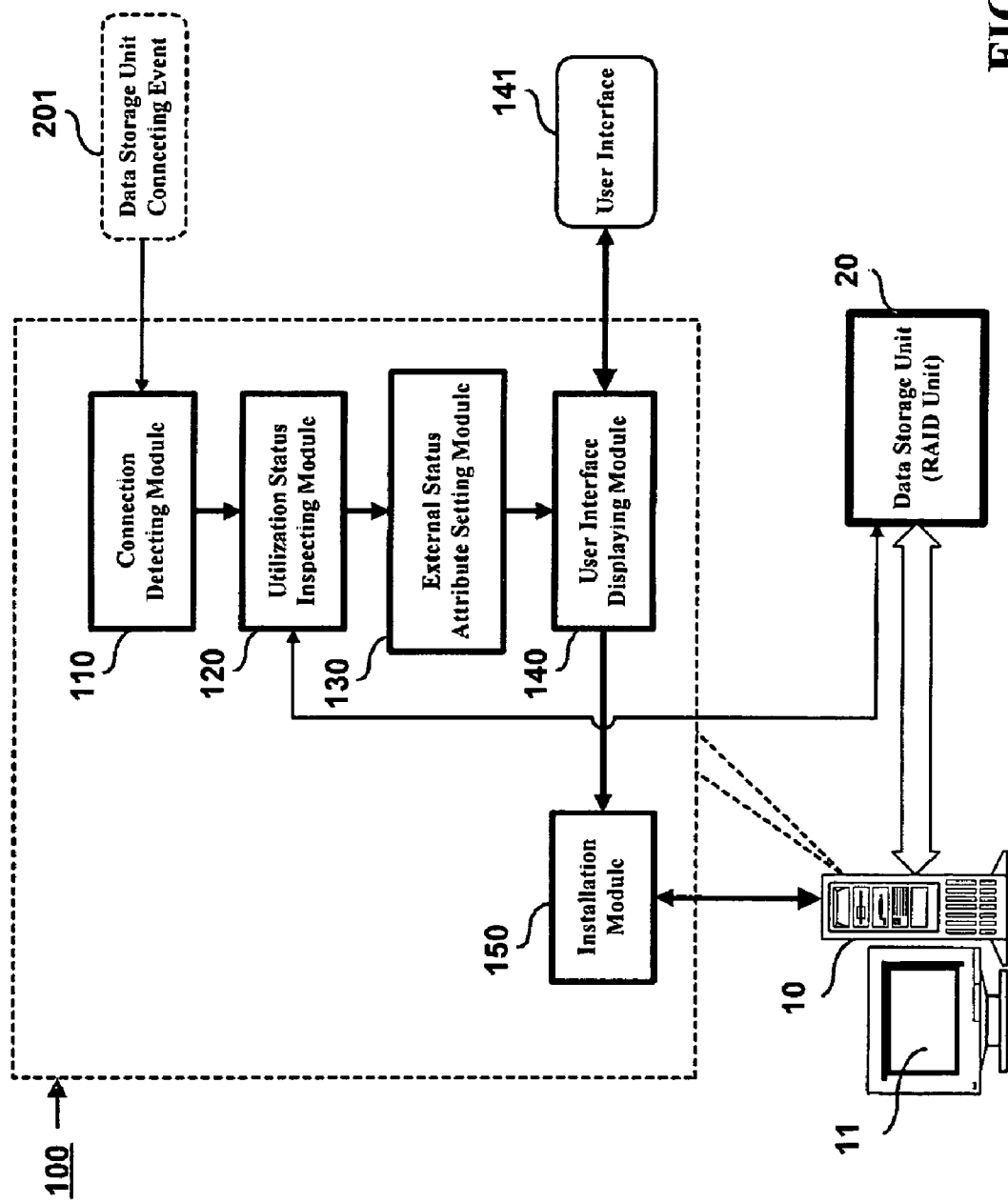
FIG. 1 is a schematic diagram showing the application architecture and modularized object-oriented component model of the computer data storage unit reinstallation data protection system according to the invention.

FIG. 1 is a schematic diagram showing the application architecture and modularized object-oriented component model of the computer data storage unit reinstallation data protection system according to the invention (as the part enclosed in the dotted box indicated by the reference numeral 100). As shown, the computer data storage unit reinstallation data protection system of the invention 100 is designed for use in conjunction with a computer platform 10, such as a network server, that is to be connected to a data storage unit, such as a RAID (Redundant Array of Independent Disks) unit 20, for providing the RAID unit 20 with a reinstallation data protection function, whereby if the RAID unit 20 contains data that are intended to be used on the computer platform 10, then the computer data storage unit reinstallation data protection system of the invention 100 is capable of preventing the RAID unit 20 from being inadvertently formatted by the user during the reinstallation that would otherwise cause all the old data on the reinstalled RAID unit 20 to be entirely lost.

As shown in FIG. 1, the modularized object-oriented component model of the computer data storage unit reinstallation data protection system of the invention 100 comprises: (a) a connection detecting module 110; (b) a utilization status inspecting module 120; (c) an external status attribute setting module 130; (d) a user interface displaying module 140; and (e) an installation module 150. In practical implementation, for example, the computer data storage unit reinstallation data protection system of the invention 100 can be entirely realized through computer code which is integrated as an add-on software or firmware module to the operating system or BIOS (Basic Input/Output System) of the computer platform 10 for the computer code to be executed to provide the desired reinstallation data protection function.

The connection detecting module 110 is capable of generating a utilization status inspection enable message to the utilization status inspecting module 120 in response to a data storage unit connecting event 201 that is initiated when the RAID unit 20 is being connected by, for example hot plugging, to the computer platform 10.

The utilization status inspecting module 120 is capable of being activated in response to the utilization status inspection enable message from the connection detecting module 110 to inspect the utilization status of the RAID unit 20 and registering the inspected utilization status as an internal status attribute in such a manner that if the RAID unit 20 is a new and unused one, the internal status attribute is registered as "unused status"; if the RAID unit 20 contains data but wasn't previously installed on this computer platform 10 (i.e., was previously installed on a computer platform of a not-fully-compatible model), the internal status attribute is registered as "unrecognizable status"; and if the RAID unit 20 contains data and was previously installed on this computer platform 10, the internal status attribute is registered as "recognizable status".

The external status attribute setting module 130 is capable of responding to the inspected result by the utilization status inspecting module 120 to perform an external status attribute setting procedure to set an external status attribute for the RAID unit 20; wherein if the inspected result by the utilization status inspecting module 120 is "unused status", the external status attribute is set to "usable status"; if the inspected result is "unrecognizable status", the external status attribute is also set to "usable status"; and if the inspected result is "recognizable status", the external status attribute is set to "has-been-used status".

Figure 2A:
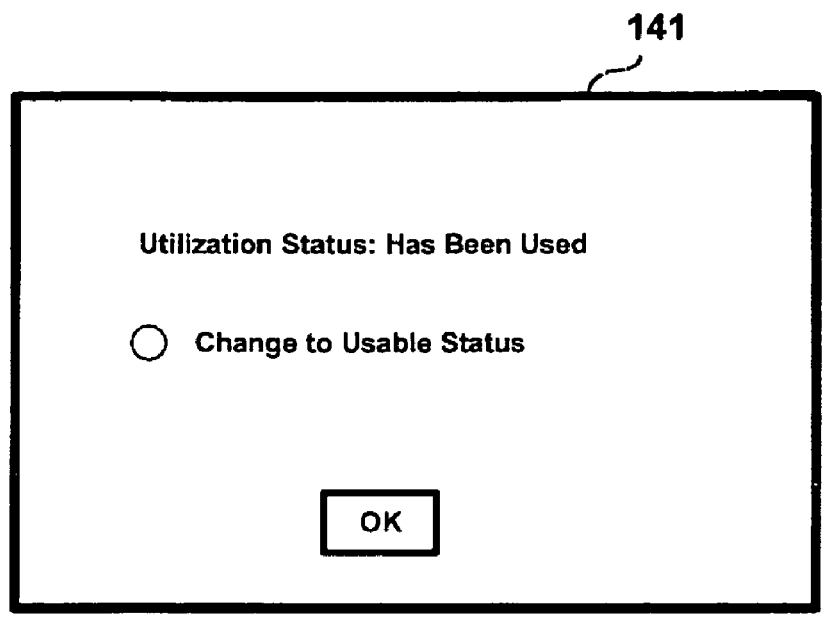
FIG. 2A is a schematic diagram showing an example of a first displayed message on a user interface utilized by the computer data storage unit reinstallation data protection system of the invention.
Figure 2B:
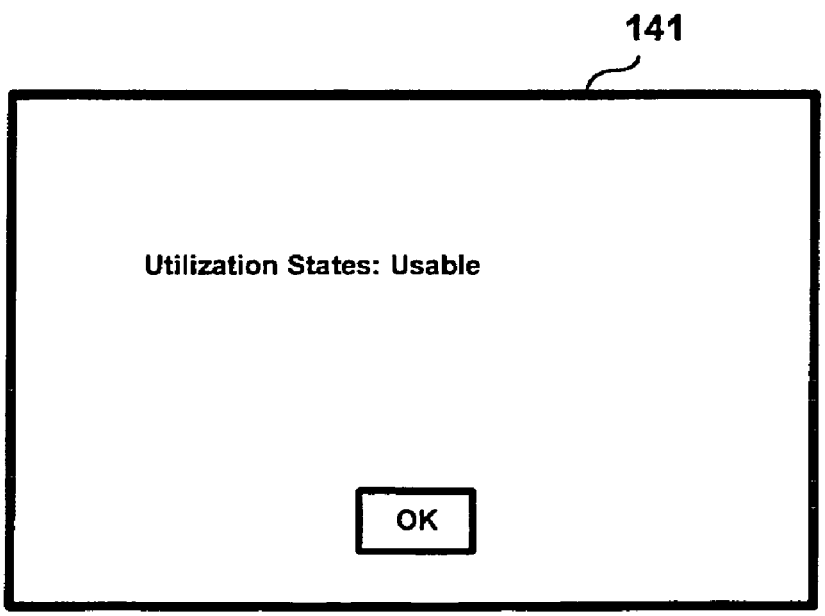
FIG. 2B is a schematic diagram showing an example of a second displayed message on a user interface utilized by the computer data storage unit reinstallation data protection system of the invention.

The user interface displaying module 140 is capable of displaying a user interface 141 on the computer platform 10 with different messages and options as respectively shown in FIG. 2A and FIG. 2B (note that the messages and options shown in FIG 2A and FIG. 2B are intended for demonstrative purpose; various other forms and methods of presenting these messages and options are feasible). In the case that the external status attribute set by the external status attribute setting module 130 is "has-been-used status", then as illustrated in FIG. 2A, the user interface 141 will display that the utilization status is "Has Been Used" and further display an option "Change to Usable Status" for the user to choose to change the utilization status to "usable status". On the other hand, in the case that the external status attribute set by the external status attribute setting module 130 is "usable status", then as illustrated in FIG. 2B, the user interface 141 will display that the utilization status is "Usable".

The installation module 150 is capable of performing an installation procedure for installing the RAID unit 20 onto the computer platform 10, in such a manner that in the case that the external status attribute of the RAID unit 20 is "has-been-used status", the installation module 150 allows the user to choose to either perform a formatting installation procedure or a non-formatting installation procedure, where the formatting installation procedure will format the RAID unit 20 into a new storage unit (i.e., all the old data on the RAID unit 20 will be lost), and the non-formatting installation procedure will reinstall the RAID unit 20 as an old storage unit and thus keep all the old data thereon. On the other hand, in the case that the external status attribute is "usable status" and the user chooses to perform a formatting installation procedure, the installation module 150 will first inspect whether the internal status attribute of the RAID unit 20 is "unrecognizable status"; and if YES, the installation module 150 will display an asking message for the user to confirm that the RAID unit 20 contains data from a not-fully-compatible server model that are still wanted; if YES, the formatting installation procedure is inhibited; otherwise, the formatting installation procedure is allowed. This precaution step can help prevent the RAID unit 20 which contains usable data from being mistakenly regarded by the user as a brand new one and thus formatted by the user during installation that causes all the data in the RAID unit to be lost.

In the following description of practical applications of the invention, it is assumed that 3 different RAID units are to be installed onto the computer platform 10, including a first RAID unit HDD1 which is a brand new and unused one; a second RAID unit HDD2 which was previously used on another computer platform and thus contains data but has never been installed on this computer platform 10; and a third RAID unit HDD3 which was previously installed on this computer platform 10 and was then removed from this computer platform 10 but is now intended to be reinstalled back to this computer platform 10.

Referring to FIG. 1 together with FIGS. 2A-2B, in the first application example, it is assumed that the user connects the computer platform 10 with the RAID unit HDD1 (i.e., a brand new and unused RAID unit). In this case, it will first cause the connection detecting module 110 of the computer data storage unit reinstallation data protection system of the invention 100 to respond by issuing a utilization status inspection enable message to the utilization status inspecting module 120, causing the utilization status inspecting module 120 to respond by inspecting the utilization status of the RAID unit 20 and registering the inspected utilization status as an internal status attribute. In this case, since the RAID unit HDD1 is a brand new and unused one, the internal status attribute is registered as "unused status". Subsequently, the external status attribute setting module 130 will respond to the inspected result from the utilization status inspecting module 120 to perform an external status attribute setting procedure to set an external status attribute for the RAID unit HDD1. Since the inspected result by the utilization status inspecting module 120 is "unused status", the external status attribute is set to "usable status" Next, the user interface displaying module 140 is activated to display a user interface 141 on the screen 11 of the computer platform 10 for displaying a corresponding message indicative of the "usable status" of the RAID unit HDD1. In this case, the user can activate the installation module 150 and choose to perform a formatting installation procedure on the RAID unit HDD1. Before actually formatting the RAID unit HDD1, the installation module 150 will first check the internal status attribute of the RAID unit HDD1 to see whether the internal status attribute is "unused status" or "unrecognizable status". If "unused status", it indicates the formatting installation procedure is allowable and thus the installation module 150 is allowed to format the RAID unit HDD1 during the installation for the computer platform 10 to use the RAID unit HDD1 as a new storage unit.

In the second application example, it is assumed that the user connects the computer platform 10 with the RAID unit HDD2 (i.e., the RAID unit that was previously used on another computer platform and thus contains data but has never been installed on this computer platform 10). In this case, it will cause the connection detecting module 110 of the computer data storage unit reinstallation data protection system of the invention 100 to respond by issuing a utilization status inspection enable message to the utilization status inspecting module 120, causing the utilization status inspecting module 120 to respond by inspecting the utilization status of the RAID unit 20 and registering the inspected utilization status as an internal status attribute. In this case, since the RAID unit HDD2 was previously used on another computer platform and thus contains data but has never been installed on this computer platform 10, the internal status attribute is registered as "unrecognizable status". Subsequently, the external status attribute setting module 130 will respond to the inspected result by the utilization status inspecting module 120 to perform an external status attribute setting procedure to set an external status attribute for the RAID unit HDD2. Since the inspected result by the utilization status inspecting module 120 is "unrecognizable status", the external status attribute is set to "usable status". Next, the user interface displaying module 140 is activated to display a user interface 141 on the screen 11 of the computer platform 10 for displaying a corresponding message in the user interface 141 indicative of the "usable status" of the RAID unit HDD2. In this case, the user can activate the installation module 150 and choose either to perform a formatting installation procedure or a non-formatting installation procedure on the RAID unit HDD2. If the user chooses to perform a formatting installation procedure, the installation module 150 will first check the internal status attribute of the RAID unit HDD2 to see whether the internal status attribute is "unrecognizable status" If YES, the installation module 150 will display an asking message for user confirmation, i.e., for the user to confirm whether the RAID unit HDD2 was used on another computer platform of an incompatible model and contains data that are still wanted. If the user has mistakenly connected the RAID unit HDD2 to the computer platform 10 (which is a wrong platform where the RAID unit HDD2 shouldn't be installed), the user can now remove the RAID unit HDD2 from the computer platform 10. Otherwise, the formatting installation procedure is enabled to allow the computer platform 10 to format the RAID unit HDD2. This precaution step can help prevent the RAID unit HDD2 which contains usable data from being mistakenly regarded by the user as a brand new RAID unit and thus formatted by the user during installation that would cause all the data in the old RAID unit to be lost.

In the third application example, it is assumed that the user connects the computer platform 10 with the RAID unit HDD3 (i.e., the RAID unit which was previously installed on this computer platform 10 and thus contains data and then was removed from this computer platform 10 but is now intended to be reinstalled back to this computer platform 10). In this case, it will cause the connection detecting module 110 of the computer data storage unit reinstallation data protection system of the invention 100 to respond by issuing a utilization status inspection enable message to the utilization status inspecting module 120, causing the utilization status inspecting module 120 to respond by inspecting the utilization status of the RAID unit 20 and registering the inspected utilization status as an internal status attribute. In this case, since the RAID unit HDD3 was previously installed on this computer platform 10, the internal status attribute is registered as "recognizable status". Subsequently, the external status attribute setting module 130 will respond to the inspected result by the utilization status inspecting module 120 to perform an external status attribute setting procedure to set an external status attribute for the RAID unit HDD3. Since the inspected result by the utilization status inspecting module 120 is "recognizable status", the external status attribute is set to "has-been-used status". Next, the user interface displaying module 140 is activated to display a user interface 141 on the screen 11 of the computer platform 10 for displaying a corresponding message indicative of the "has-been-used status" of the RAID unit HDD3 to the user. In this case, the user can then activate the installation module 150 and the user is only allowed to choose a non-formatting installation procedure for he RAID unit HDD3 that allows the old data on the RAID unit HDD3 to be accessible by the computer platform 10 after installation.

In conclusion, the invention provides a computer data storage unit reinstallation data protection method and system for use with a computer platform for providing a reinstallation data protection function to a data storage unit that is to be installed onto the computer platform, which is characterized by the categorization of the utilization status of a RAID unit into 3 internal status attributes, including "unused status", "unrecognizable status", and "recognizable status" for internal use by the computer platform, but with the user interface still including only 2 external status attributes, i.e., usable status and has-been-used status, such that in the case that the external status attribute of the RAID unit is usable status and the user chooses to perform a formatting installation procedure, the internal status attribute of the RAID unit is first check to see if it is unrecognizable status; and if YES, an asking message is displayed for user confirmation. This feature can help prevent the RAID unit which contains data that are still wanted from being mistakenly regarded by the user as a brand new RAID unit and thus formatted by the user during installation that would cause all the old data in the RAID unit to be lost. The invention is therefore more advantageous to use than the prior art.

Figure 3:
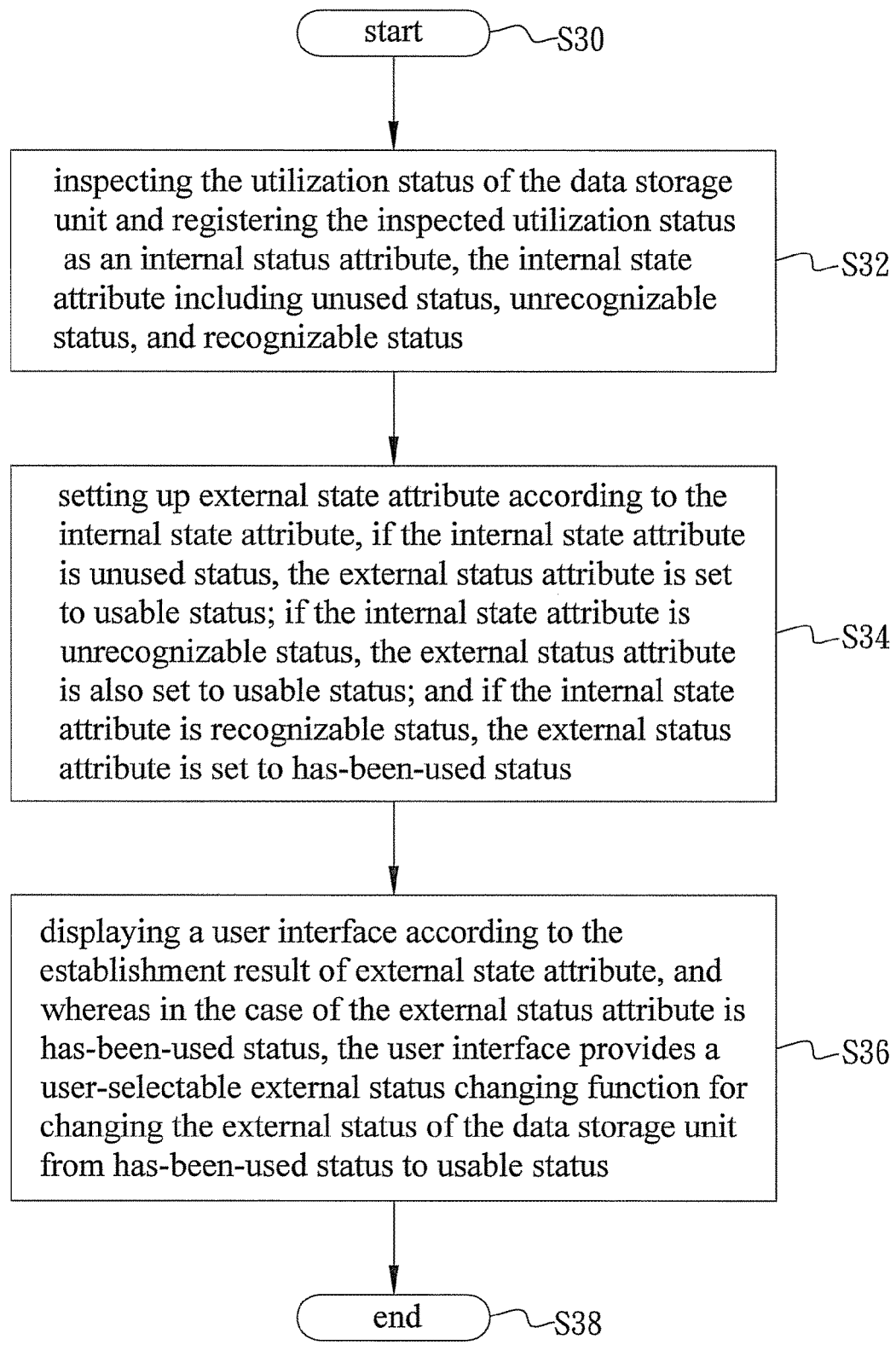
FIG. 3 is a flowchart of a computer data storage unit reinstallation data protection method according to the present invention.

FIG. 3 is a flowchart of a computer data storage unit reinstallation data protection method according to the present invention. The method begins in step S30 and ends in step S38. The method comprises inspecting the utilization status of the data storage unit and registering the inspected utilization status as an internal status attribute, the internal state attribute including unused status, unrecognizable status, and recognizable status (step S32); setting up external state attribute according to the internal state attribute, if the internal state attribute is unused status, the external status attribute is set to usable status; if the internal state attribute is unrecognizable status, the external status attribute is also set to usable status; and if the internal state attribute is recognizable status, the external status attribute is set to has-been-used status (step S34); and displaying a user interface according to the establishment result of external state attribute, and whereas in the case of the external status attribute is has-been-used status, the user interface provides a user-selectable external status changing function for changing the external status of the data storage unit from has-been-used status to usable status (step S36).

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A computer data storage unit reinstallation data protection method for use on a computer platform for providing a reinstallation data protection function to a data storage unit that is to be installed onto the computer platform;

the computer data storage unit reinstallation data protection method comprising:

generating a utilization status inspection enable message in response to a data storage unit connecting event that is initiated when the data storage unit is being connected to the computer platform;

responding to the utilization status inspection enable message by inspecting the utilization status of the data storage unit and registering the inspected utilization status as an internal status attribute in such a manner that if the data storage unit is a new and unused one, the internal status attribute is registered as unused status, if the data storage unit contains data but hasn't previously been installed on the computer platform, the internal status attribute is registered as unrecognizable status, and if the data storage unit contains data and was previously installed on the computer platform, the internal status attribute is registered as recognizable status;

performing an external status attribute setting procedure to set an external status attribute for the data storage unit, in such a manner that if the inspected result is unused status, the external status attribute is set to usable status; if the inspected result is unrecognizable status, the external status attribute is also set to usable status; and if the inspected result is recognizable status, the external status attribute is set to has-been-used status;

responding to the external status attribute of the data storage unit by displaying a corresponding message in a user interface, in such a manner that in the case that the external status attribute is usable status, the user interface displays a message indicative of the usable status of the data storage unit; and whereas in the case of the external status attribute is has-been-used status, the user interface provides a user-selectable external status changing function for changing the external status of the data storage unit from has-been-used status to usable status; and performing an installation procedure for installing the data storage unit onto the computer platform, in such a manner that in the case that the external status attribute of the data storage unit is has-been-used status, either a formatting installation procedure or a non-formatting installation procedure is allowed depending on user-selection; and whereas in the case that the external status attribute is usable status and user-selected option is a formatting installation procedure, inspecting whether the internal status attribute of the data storage unit is unrecognizable status; and if YES, displaying an asking message for user confirmation.

2. The computer data storage unit reinstallation data protection method of claim 1, wherein the computer platform is a network server.

3. The computer data storage unit reinstallation data protection method of claim 1, wherein the data storage unit is a Redundant Array of Independent Disks (RAID) unit.

4. A computer data storage unit reinstallation data protection system for use with a computer platform for providing a reinstallation data protection function to a data storage unit that is to be installed onto the computer platform;

the computer data storage unit reinstallation data protection system comprising:

a computer platform;

a connection detecting module, which is capable of generating a utilization status inspection enable message in response to a data storage unit connecting event that is initiated when the data storage unit is being connected to the computer platform;

a utilization status inspecting module, which is capable of responding to the utilization status inspection enable message from the connection detecting module by inspecting the utilization status of the data storage unit and registering the inspected utilization status as an internal status attribute in such a manner that if the data storage unit is a new and unused one, the internal status attribute is registered as unused status, if the data storage unit contains data but hasn't previously been installed on the computer platform, the internal status attribute is registered as unrecognizable status, and if the data storage unit contains data and was previously installed on the computer platform, the internal status attribute is registered as recognizable status;

an external status attribute setting module, which is capable of responding to the inspected result by the utilization status inspecting module to perform an external status attribute setting procedure to set an external status attribute for the data storage unit, in such a manner that if the inspected result by the utilization status inspecting module is unused status, the external status attribute is set to usable status; if the inspected result is unrecognizable status, the external status attribute is also set to usable status; and if the inspected result is recognizable status, the external status attribute is set to has-been-used status;

a user interface displaying module, which is capable of displaying a user interface on the computer platform, and which is capable of responding to the particular external status attribute set by the external status attribute setting module by displaying a corresponding message in the user interface, in such a manner that in the case that the external status attribute is usable status, the user interface displays a message indicative of the usable status of the data storage unit; and whereas in the case of the external status attribute is has-been-used status, the user interface provides a user-selectable external status changing function for changing the external status of the data storage unit from has-been-used status to usable status; and an installation module, which is capable of performing an installation procedure for installing the data storage unit onto the computer platform, in such a manner that in the case that the external status attribute of the data storage unit is has-been-used status, the installation module is allowed to perform either a formatting installation procedure or a non-formatting installation procedure depending on user-selection; and whereas in the case that the external status attribute is usable status and user-selected option is a formatting installation procedure, the installation module first inspects whether the internal status attribute of the data storage unit is unrecognizable status; and if the internal status attribute of the data storage unit is unrecognizable status, the installation module displays an asking message for user confirmation.

5. The computer data storage unit reinstallation data protection system of claim 4, wherein the computer platform is a network server.

6. The computer data storage unit reinstallation data protection system of claim 4, wherein the data storage unit is a Redundant Array of Independent Disks (RAID) unit.

7. A computer data storage unit reinstallation data protection system for use with a computer for providing a reinstallation data protection function to a data storage unit that is to be installed onto the computer;

the computer data storage unit reinstallation data protection system comprising executable code for instructing the computer to perform the following steps:

generating a utilization status inspection enable message in response to a data storage unit connecting event that is initiated when the data storage unit is being connected to the computer;

responding to the utilization status inspection enable message from the connection detecting module by inspecting the utilization status of the data storage unit and registering the inspected utilization status as an internal status attribute in such a manner that if the data storage unit is a new and unused one, the internal status attribute is registered as unused status, if the data storage unit contains data but hasn't previously been installed on the computer, the internal status attribute is registered as unrecognizable status, and if the data storage unit contains data and was previously installed on the computer, the internal status attribute is registered as recognizable status;

responding to the inspected result by the utilization status inspecting module to perform an external status attribute setting procedure to set an external status attribute for the data storage unit, in such a manner that if the inspected result by the utilization status inspecting module is unused status, the external status attribute is set to usable status; if the inspected result is unrecognizable status, the external status attribute is also set to usable status; and if the inspected result is recognizable status, the external status attribute is set to has-been-used status;

displaying a user interface on the computer, and which is capable of responding to the particular external status attribute set by the external status attribute setting module by displaying a corresponding message in the user interface, in such a manner that in the case that the external status attribute is usable status, the user interface displays a message indicative of the usable status of the data storage unit; and whereas in the case of the external status attribute is has-been-used status, the user interface provides a user-selectable external status changing function for changing the external status of the data storage unit from has-been-used status to usable status; and performing an installation procedure for installing the data storage unit onto the computer, in such a manner that in the case that the external status attribute of the data storage unit is has-been-used status, the installation module is allowed to perform either a formatting installation procedure or a non-formatting installation procedure depending on user-selection; and whereas in the case that the external status attribute is usable status and user-selected option is a formatting installation procedure, the installation module first inspects whether the internal status attribute of the data storage unit is unrecognizable status;

and if the internal status attribute of the data storage unit is unrecognizable status, the installation module displays an asking message for user confirmation.

\* \* \* \* \*